United States Patent [19]
Yoneyama et al.

[11] Patent Number: 5,400,101
[45] Date of Patent: Mar. 21, 1995

[54] ZOOMING FINDER

[75] Inventors: Shuji Yoneyama; Takayuki Ito, both of Tokyo, Japan

[73] Assignee: Asahi Kogaku Kogyo Kabushiki Kaisha, Tokyo, Japan

[21] Appl. No.: 942,446

[22] Filed: Sep. 9, 1992

[30] Foreign Application Priority Data

Sep. 10, 1991 [JP] Japan .................... 3-230127

[51] Int. Cl.⁶ ............................................ G03B 13/10
[52] U.S. Cl. ................................. 354/222; 354/225; 359/683; 359/708
[58] Field of Search ............... 354/222, 225; 359/683, 359/708

[56] References Cited

U.S. PATENT DOCUMENTS 4,834,513  5/1989  Nozawa .................... 354/222
5,052,787  10/1991  Sugawara .................... 359/683

FOREIGN PATENT DOCUMENTS 2225871A  6/1990  United Kingdom .
2225871   6/1990  United Kingdom .

Primary Examiner—Michael L. Gellner
Assistant Examiner—Eddie C. Lee
Attorney, Agent, or Firm—Sughrue, Mion, Zinn, Macpeak & Seas

[57] ABSTRACT

An improved zooming viewfinder includes, in order from the object side, a positive first lens group, a negative second lens group that has a zooming capability and which is capable of moving along the optical axis, a negative third lens group that has a half mirror surface on the pupil side, and a fourth lens group that is a positive eyepiece and which has a field-limiting frame on the side the closest to the object. The eyepiece includes, in order from the object side, a positive lens element 4a and a negative lens element 4b.

9 Claims, 7 Drawing Sheets

ZOOMING FINDER

BACKGROUND OF THE INVENTION

This application is based upon Japanese Patent Application No. Hei 3-230127 on which priority is claimed, a disclosure of which is incorporated by reference.

The present invention relates to a zooming viewfinder that is primarily intended to be used with compact cameras.

An example of the prior art zooming viewfinders for use with compact cameras is shown schematically in FIG. 14.

The viewfinder shown in FIG. 14 comprises, in order from the object side, a biconvex first lens 1, a second and third lens 2 and 3 which are each a negative meniscus lens, and a positive fourth and a fifth lens 4 and 5 which compose an eyepiece. The surface on the pupil side of the third lens 3 is a half mirror surface m and a field-limiting frame f is depicted on the object side of the fourth lens 4. The field-limiting frame f on the fourth lens 4 is illuminated with incoming rays of light from the object and the light reflected by the half mirror surface m travels through the eyepiece to be incident on the pupil of the viewer (not shown).

Referring to FIG. 14, a light beam L1 intercepting the first lens group 1 at height H' passes through the pupil P at a position of height HL, whereas a light beam L2 indicated by a one-dot-and-dash line passes through the pupil P at a position of height HU.

However, with the prior art zooming viewfinder described above, the lens diameter of the first lens group on the object side has to be made large for two reasons: the first reason is that the pupil is located in a rear position; secondly, it is necessary to insure that the light reflected from the field-limiting frame illuminated by the brightness of the object will not undergo vignetting at the position of the pupil.

If the diameter of the first lens group is small, a light beam L3 that intercepts the first lens group at height H and which is indicated by a dashed line will pass through the pupil P at a position lower than HL as also indicated by a dashed line and, as a result, the illumination falling on the viewfinder or the field-limiting frame becomes deficient.

SUMMARY OF THE INVENTION

The present invention has been accomplished under these circumstances and has as an object providing a zooming Albada finder that will not cause vignetting of the reflected light from the field-limiting frame even if the lens diameter of the front group on the object side is reduced.

Another object of the present invention is to provide a zooming viewfinder that is capable of effective correction of aberrations even if the lens diameter of the front group is reduced.

According to its first aspect, the present invention attains these objects by a zooming viewfinder that comprises, in order from the object side, a positive first lens group, a negative second lens group that has a zooming capability and which is capable of moving along the optical axis, a negative third lens group that has a half mirror surface on the pupil side, and a fourth lens group that is a positive eyepiece and which has a field-limiting frame on the side the closest to the object, said eyepiece comprising, in order from the object side, a positive lens element 4a and a negative lens element 4b.

According to its second aspect, the present invention attains those objects by a zooming viewfinder that comprises, in order from the object side, a positive first lens group, a negative second lens group that has a zooming capability and which is capable of moving along the optical axis, and an eyepiece having a positive overall power, which zooming viewfinder satisfies the following conditions:

$$1.55 < N1$$

$$1.55 < N2$$

where
N1: the refractive index of the first lens group; and
N2: the refractive index of the second lens group.

DESCRIPTION OF THE PREFERRED EMBODIMENTS

Examples of the present invention are described below.

Figure 1:
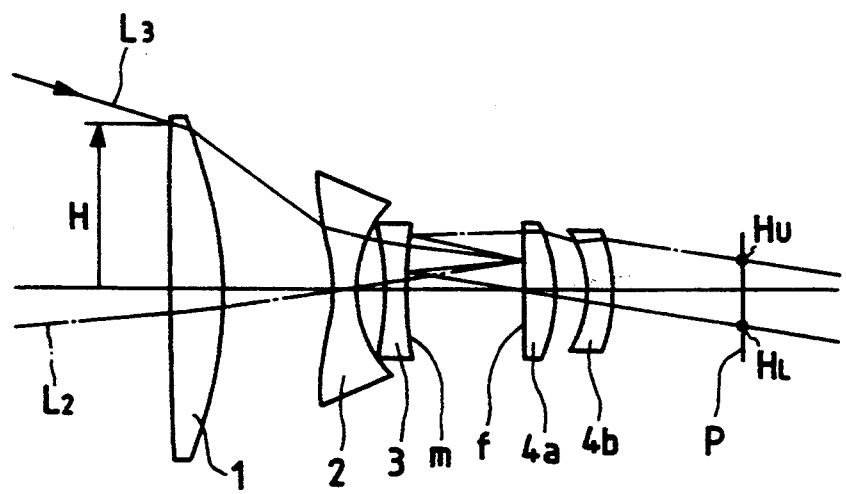
FIG. 1 is a simplified cross-sectional view showing the lens action common to the zooming viewfinders of the examples of the present invention.

FIG. 1 is a simplified cross-sectional view showing the lens action common to the zooming viewfinders of the examples of the present invention. As shown, the basic finder comprises, in order from the object side, a positive first lens group 1, a second and a third lens group 2 and 3 which are each a negative meniscus lens, a positive lens element 4a and a negative lens element 4b that compose an eyepiece. The surface on the pupil side of the third lens group is a concave half mirror surface m and a field-limiting frame f is depicted on the object side of the lens element 4a. The field-limiting frame f on the lens element 4a is illuminated with incoming rays of light from the object and the light reflected by the half mirror surface m travels through the eyepiece to be incident on the pupil of the viewer (not shown).

The second lens group 2 is moved along the optical axis during zooming. The finder may be composed either in such a way that only the second lens group is moved to effect zooming while keeping the dioptric strength substantially constant or in such a way that the first lens group is moved along the optical axis to insure that the dioptric strength is held constant as the second lens group is moved.

Figure 14:
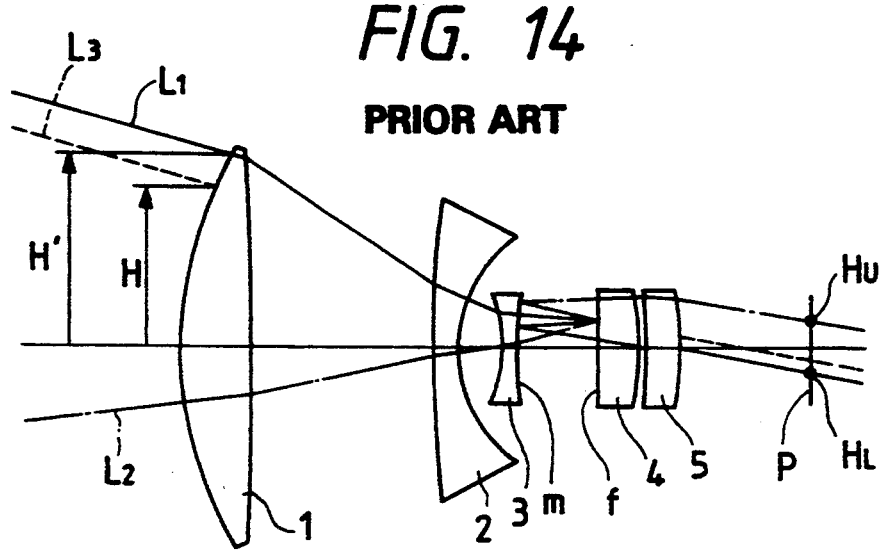
FIG. 14 is a simplified cross-sectional view showing the lens action of a prior art zooming viewfinder.

FIGS. 1 and 14 show the relationship between the lens diameter of the first lens group 1 and the condition for preventing the vignetting of reflected light from the field-limiting frame f (this condition is hereinafter referred to as the "lighting condition").

If the lens diameter of the first lens group 1 is reduced in the prior art finder system to such an extent that the light beam L3 intercepting the first lens group at height H as indicated by a dashed line in FIG. 14 travels in the outermost path, the light beam L3 will pass through the pupil P in an area close to the optical axis as indicated by a dashed line. Hence, the field-limiting frame becomes no longer visible to the viewer if he moves his eye only slightly.

In order to reduce the diameter of the first lens group 1 and yet insure that the incident light beam travelling in the outermost path will pass through the pupil P at a position remote from the optical axis, the light beam that is reflected the second time from the half mirror surface m must form a comparatively large angle with respect to the optical axis.

To this end, one may reduce the distance from the lens element 4a in the eyepiece to the pupil P. However, at the same time, the distance between the lens element 4b located on the side the closest to the pupil P and that pupil must be increased; otherwise, the field of view and the field-limiting frame will become difficult to view.

Under the circumstances, the viewfinder system of the present invention increases the distance from the lens element 4b to the pupil P while reducing the distance from the lens element 4a to the pupil P by designing an eyepiece that comprises a positive lens element and a negative lens element in order from the object side.

With this lens composition, the light beam L3 intercepting the first lens group 1 at height H as shown in FIG. 1 will pass through the pupil P at the same height HL as does the light beam L1 which intercepts the first lens group 1 at height H' in the prior art system.

It should be noted here that since the condition for the light beam L2 is usually determined by the lens diameter of the eyepiece, one only need design the system in such a way as to prevent the vignetting of light rays falling at the edges of the field of view and there is no need to consider the lighting condition for the field-limiting frame.

The viewfinder of the examples under consideration further satisfies the following conditions (1) to (5):

$$-0.35 < f4/f4b < 0.0 \tag{1}$$

$$0.05 < L/f4 < 0.35 \tag{2}$$

$$-0.7 < rb/f4 < -0.1 \tag{3}$$

$$-0.8 < ra/f4 < -0.2 \tag{4}$$

$$1 < rh/f4 < 2 \tag{5}$$

where
- f4: the composite focal length of the fourth lens group taken as a whole;
- f4b: the focal length of the lens element 4b;
- L: the distance between the lens elements 4a and 4b;
- rb: the radius of curvature of the concave surface on the object side of the lens element 4b;
- ra: the radius of curvature of the convex surface on the pupil side of the lens element 4a; and
- rh: the radius of curvature of the concave half mirror surface on the pupil side of the third lens group.

Condition (1) relates to the power of the lens element 4b in the eyepiece. If the upper limit of this condition is exceeded, the power of the lens element 4b becomes positive, adversely affecting the lighting condition. If the lower limit of condition (1) is not reached, the negative power of the lens element 4b becomes excessive. At the same time, in order to compose an eyepiece that has a positive overall power, the power of the positive lens element 4a must also be increased to an excessive level, making it difficult to achieve effective correction of aberrations that will develop in the overall finder system or the field-limiting frame unit, i.e., the portion where light rays reflected from the field-limiting frame make reentry into the eyepiece.

Condition (2) relates to the layout of the lens elements 4a and 4b in the eyepiece. If the upper limit of this condition is exceeded, the distance from the lens element 4b to the pupil will decrease. If the lower limit of condition (2) is not reached, the distance between the lens elements 4a and 4b becomes so small that in order to keep a good lighting condition, the negative power of the lens element 4b is likely to increase to such an extent that the lower limit of condition (1) is no longer reached, thus making it difficult to correct aberrations.

Conditions (3) and (4) related to the geometry of the lens elements 4a and 4b which compose the eyepiece. If the lower limit of condition (3) is not reached, the power of the divergent surface of the lens element 4b becomes small, which is unfavorable for the lighting condition. Exceeding the upper limit of condition (3) is favorable for the lighting condition but, on the other hand, the radius of curvature of the lens element 4b becomes so small as to present difficulty in correcting aberrations.

Condition (4) should be satisfied in order to cancel the aberrations that will develop on the divergent surface of the lens element 4b. If the lower limit of this condition is not reached, the radius of curvature of the convergent surface becomes so large that it is not capable of correcting the aberrations that develop on the divergent surface of the lens element 4b. If the upper limit of condition (4) is exceeded, the aberrations will be overcorrected.

Condition (5) relates to the geometry of the half mirror surface of the third lens group. If the lower limit of this condition is not reached, the power of the half mirror surface becomes so weak that the rays of light that are reflected from the field-limiting frame to be launched into the eyepiece and which are directed from the half mirror surface towards the eyepiece will form a smaller angle with the optical axis, which is unfavorable for the lighting condition. If the upper limit of condition (5) is exceeded, the power of the half mirror surface becomes so strong that the focal length of the field-limiting frame unit becomes very small, causing the edges of the frame to appear wide enough to make any foreign matter become readily noticeable.

In order to reduce the lens diameter of the front group while insuring effective correction of aberrations, the following conditions (6) and (7) must be satisfied:

$$1.55 < N1 \quad (6)$$

$$1.55 < N2 \quad (7)$$

where

N1: the refractive index of the first lens group; and
N2: the refrative index of the second lens group.

Conditions (6) and (7) relate to the refractive indices of the first and second lens groups. If these conditions are not met, the aberrations that will develop in the overall finder system cannot be effectively corrected when the lens diameter of the first lens group is reduced.

Aberrations can be corrected more effectively if each of the first and second lens groups has an aspheric surface on both sides.

The examples of the present invention are described below with reference to specific numerical data.

EXAMPLE 1

Figure 2:
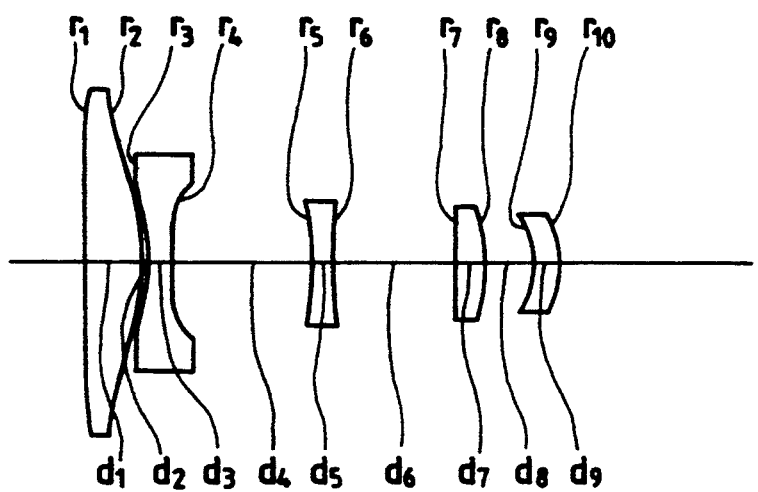
FIG. 2 is a simplified cross-sectional view at the low-magnification end of the zooming viewfinder of Example 1.

FIG. 2 is a simplified cross-sectional view at the low-magnification end of the zooming viewfinder of Example 1. The specific numerical data sheet of the finder are given in Table 1, in which r denotes the radius of curvature, d, the airspace between surfaces, nd, the refractive index at the d-line (588 nm), and νd, the Abbe number. The values of angular magnification, dioptric strength Dprt, d2 and d4 vary during zooming as shown in Table 2.

All the lens elements are composed of an aspheric surface except at the sixth and seventh faces. The shape of an aspheric surface can generally be expressed by the following equation:

$$X = \frac{CY^2}{1 + \sqrt{(1 - (1 + K)C^2Y^2)}} + A4Y^4 + A6Y^6 + A8Y^8 + A10Y^{10}$$

where X is the distance by which the coordinates at the point on the aspheric surface where the height from the optical axis is Y are departed from the plane tangent to the vertex of the aspheric surface; C is the curvature (1/r) of the vertex of the aspheric surface; K is the conic constant; and A4, A6, A8 and A10 are the aspheric coefficients of the fourth, sixth, eighth and tenth orders, respectively. The radii of curvature of aspheric surfaces listed in Table 1 are those of the vertices of the aspheric surfaces and the conic constants and aspheric coefficients of those surfaces are listed in Table 3.

Figure 3:
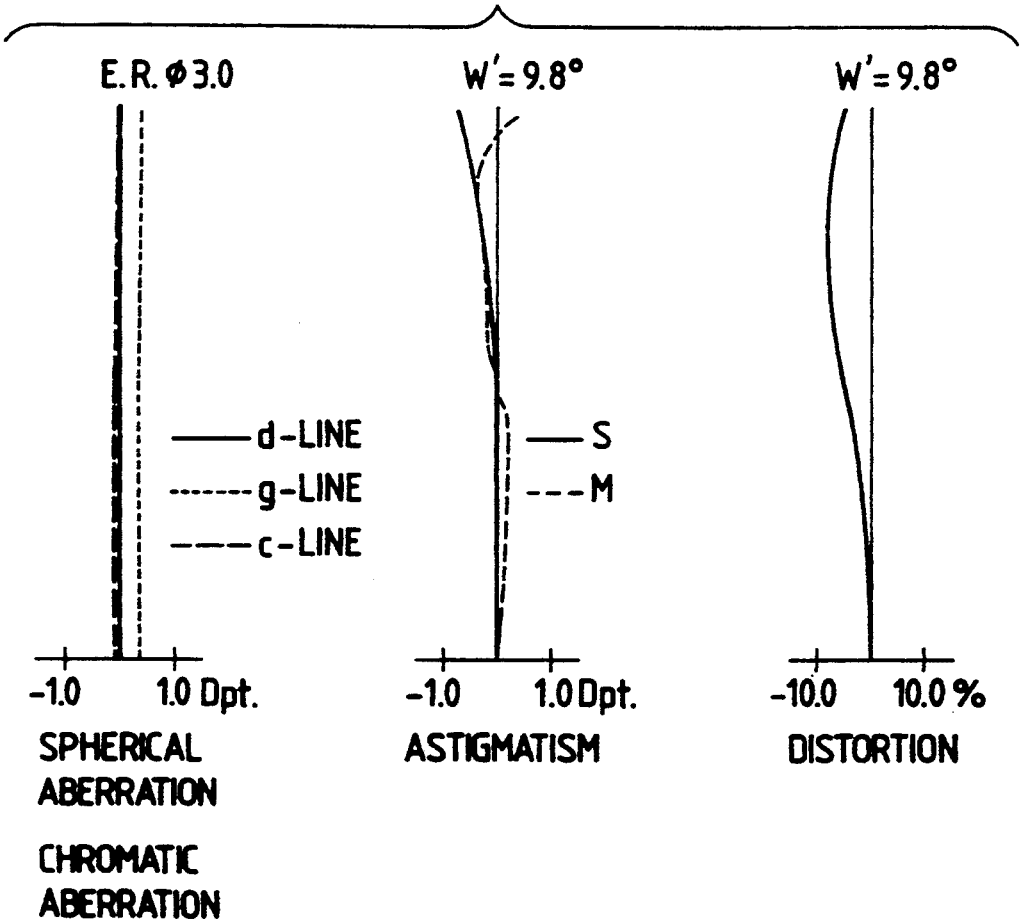
FIG. 3 is a set of graphs plotting the aberration curves obtained with the finder as shown in FIG. 2.
Figure 4:
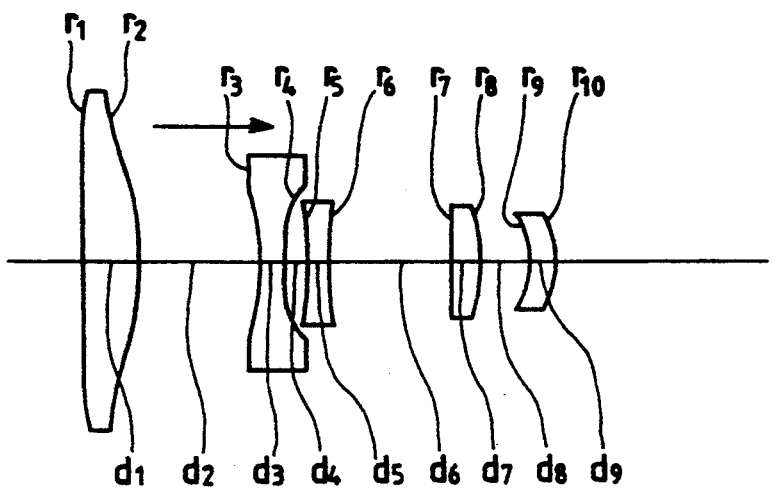
FIG. 4 is a simplified cross-sectional view at the high-magnification end of the zooming viewfinder of Example 1.
Figure 5:
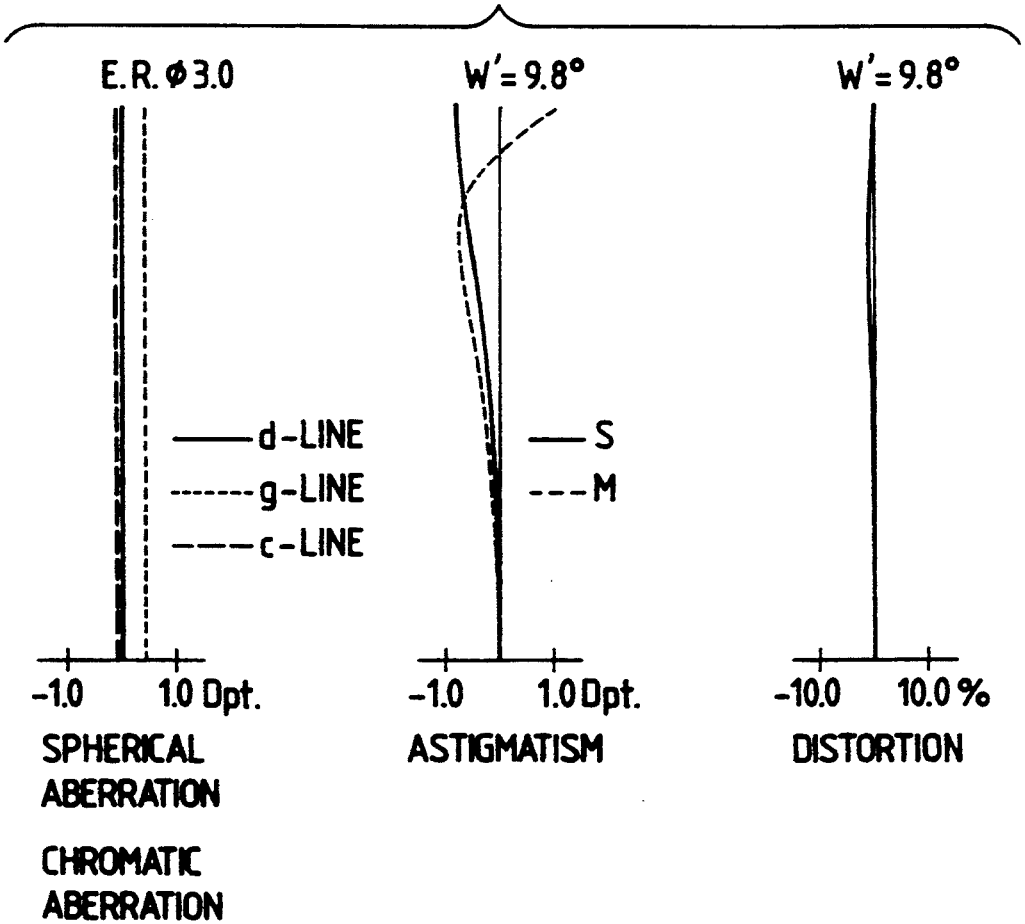
FIG. 5 is a set of graphs plotting the aberration curves obtained with the finder as shown in FIG. 4.

FIG. 3 is a set of graphs plotting the aberration curves obtained with the finder at the low-magnification end; FIG. 4 is a simplified cross-sectional view showing the finder at the high-magnification end; and FIG. 5 is a set of graphs plotting the aberration curves obtained with the finder at the high-magnification end.

TABLE 1

| Surface No. | r | d | nd | νd |
| --- | --- | --- | --- | --- |
| 1 | −122.647 | 3.59 | 1.58547 | 29.9 |
| 2 | −15.693 | variable | | |
| 3 | −10.817 | 1.50 | 1.58547 | 29.9 |
| 4 | 31.563 | variable | | |
| 5 | −14.650 | 1.40 | 1.49176 | 57.4 |
| 6 | 37.330 | 7.95 | | |
| 7 | ∞ | 1.81 | 1.49176 | 57.4 |
| 8 | −10.850 | 3.19 | | |
| 9 | −5.075 | 1.70 | 1.49178 | 57.4 |
| 10 | −5.804 | | | |

TABLE 2

| Angular magnification | 0.37× | 0.65× |
| --- | --- | --- |
| Dprt | −1.08 | −0.80 |
| d2 | 0.40 | 7.82 |
| d4 | 8.96 | 1.53 |

TABLE 3

| First surface | Second surface |
| --- | --- |
| K = −0.60000000 | K = −0.90000000 |
| A4 = 0.60143895 × 10$^{-5}$ | A4 = 0.92910854 × 10$^{-4}$ |
| A6 = 0.42474937 × 10$^{-6}$ | A6 = 0.21676244 × 10$^{-6}$ |
| A8 = −0.95464581 × 10$^{-10}$ | A8 = −0.45117004 × 10$^{-9}$ |
| A10 = 0.00000000 | A10 = 0.00000000 |
| Third surface | Fourth surface |
| K = 0.11000000 × 10 | K = −0.26000000 × 10 |
| A4 = 0.83562832 × 10$^{-4}$ | A4 = −0.15589183 × 10$^{-3}$ |
| A6 = 0.63223315 × 10$^{-4}$ | A6 = 0.70304047 × 10$^{-4}$ |
| A8 = −0.15775165 × 10$^{-5}$ | A8 = 0.14455214 × 10$^{-6}$ |
| A10 = 0.14210295 × 10$^{-7}$ | A10 = 0.00000000 |
| Fifth surface | Eighth surface |
| K = 0.00000000 | K = 0.00000000 |
| A4 = 0.53537315 × 10$^{-3}$ | A4 = 0.12016070 × 10$^{-3}$ |
| A6 = −0.73891597 × 10$^{-5}$ | A6 = −0.14393431 × 10$^{-4}$ |
| A8 = 0.60458736 × 10$^{-6}$ | A8 = 0.23119332 × 10$^{-6}$ |
| A10 = 0.00000000 | A10 = 0.00000000 |
| Ninth surface | |
| K = 0.00000000 | |
| A4 = 0.59934798 × 10$^{-4}$ | |
| A6 = −0.12368358 × 10$^{-4}$ | |
| A8 = 0.00000000 | |
| A10 = 0.00000000 | |

EXAMPLE 2

Figure 6:
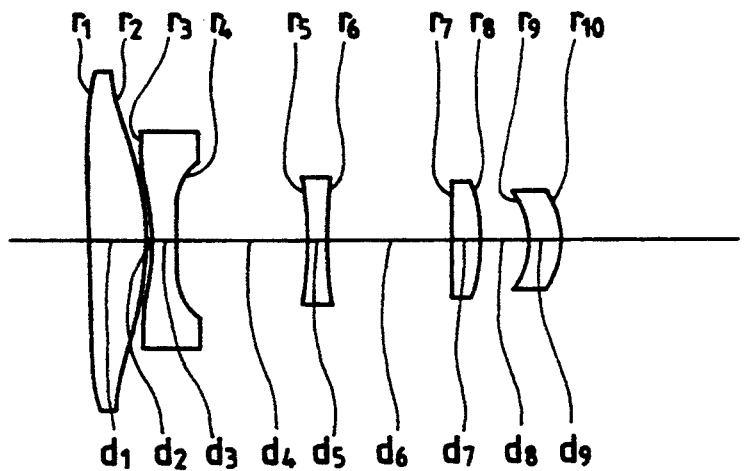
FIG. 6 is a simplified cross-sectional view at the low-magnification end of the zooming viewfinder of Example 2.

FIG. 6 is a simplified cross-sectional view at the low-magnification end of the zooming viewfinder of Example 2. The specific numerical data sheet of the finder are given in Table 4. The values of angular magnification, dioptric strength Dprt, d2 and d4 vary during zooming as shown in Table 5.

All the lens elements are composed of an aspheric surface except at the sixth, seventh and tenth faces. The conic constants and aspheric coefficients of those surfaces are listed in Table 6.

Figure 7:
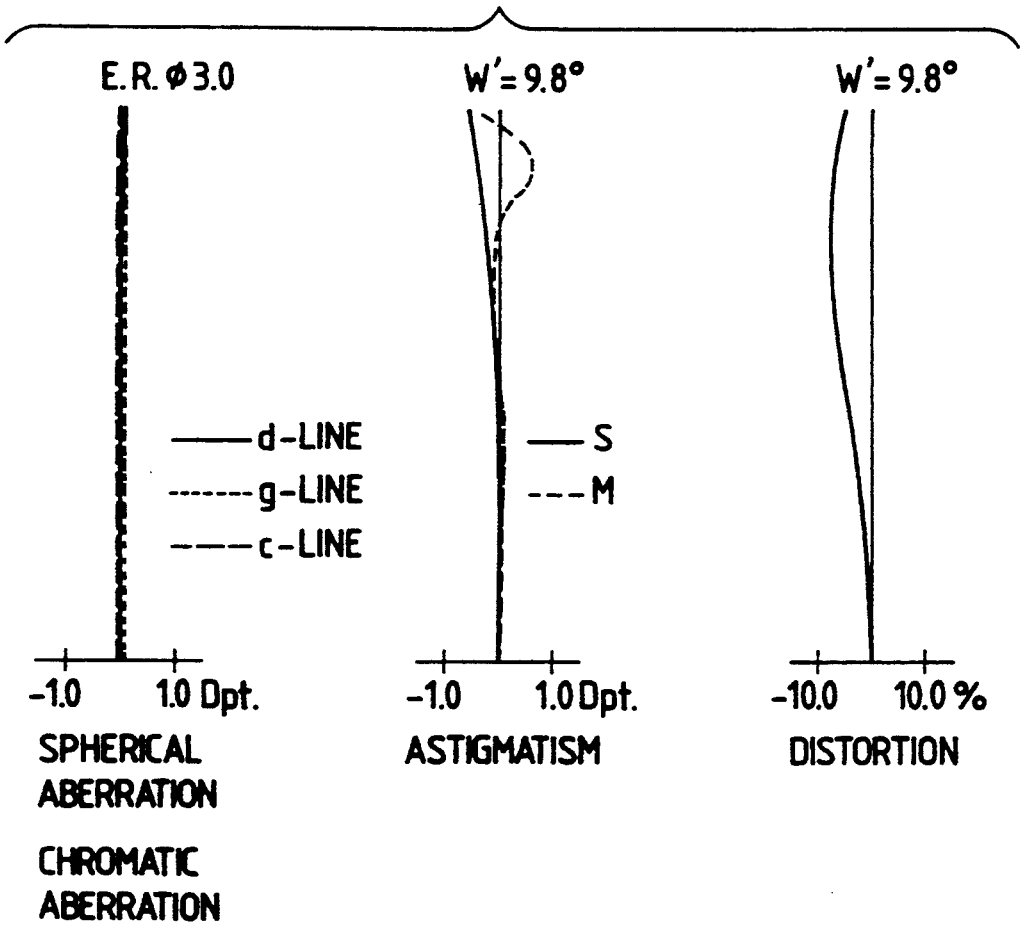
FIG. 7 is a set of graphs plotting the aberration curves obtained with the finder as shown in FIG. 6.
Figure 8:
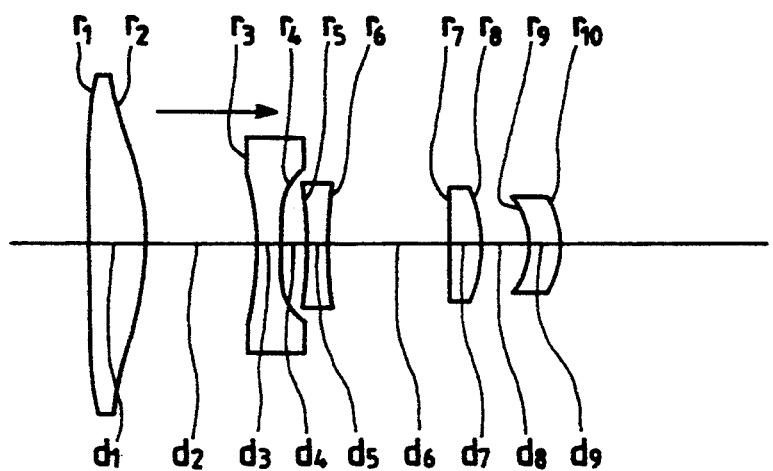
FIG. 8 is a simplified cross-sectional view at the high-magnification end of the zooming viewfinder of Example 2.
Figure 9:
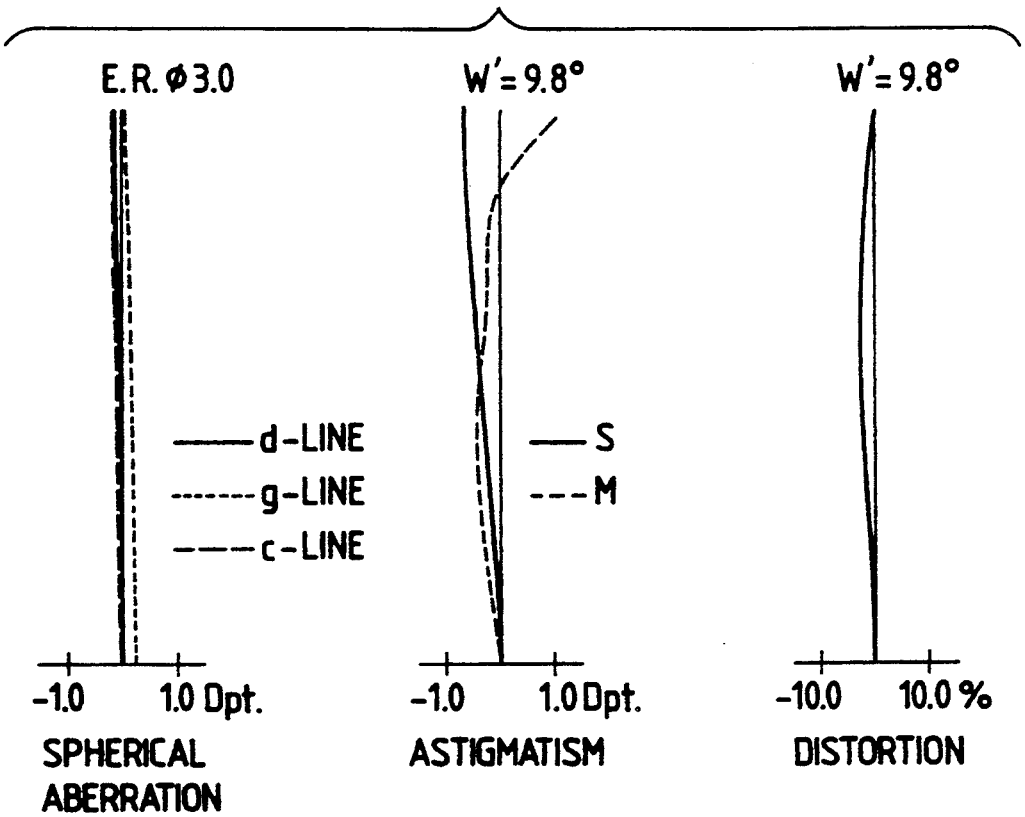
FIG. 9 is a set of graphs plotting the aberration curves obtained with the finder as shown in FIG. 8.

FIG. 7 is a set of graphs plotting the aberration curves obtained with the finder at the low-magnification end; FIG. 8 is a simplified cross-sectional view showing the finder at the high magnification end; and FIG. 9 is a set of graphs plotting the aberration curves obtained at the high-magnification end.

TABLE 4

| Surface No. | r | d | nd | νd |
| --- | --- | --- | --- | --- |
| 1 | 147.533 | 3.59 | 1.58547 | 29.9 |
| 2 | −18.938 | variable | | |
| 3 | −10.950 | 1.50 | 1.58547 | 29.9 |

TABLE 4-continued

| Surface No. | r | d | nd | νd |
|---|---|---|---|---|
| 4 | 26.457 | variable | | |
| 5 | −19.147 | 1.40 | 1.58547 | 29.9 |
| 6 | 37.286 | 7.95 | | |
| 7 | ∞ | 1.90 | 1.49176 | 57.4 |
| 8 | −10.284 | 3.16 | | |
| 9 | −4.405 | 2.04 | 1.49176 | 57.4 |
| 10 | −5.326 | | | |

TABLE 5

| Angular magnification | 0.37× | 0.65× |
|---|---|---|
| Dprt | −1.25 | −0.75 |
| d2 | 0.40 | 7.31 |
| d4 | 8.59 | 1.68 |

TABLE 6

| First surface | | Second surface | |
|---|---|---|---|
| K = | −0.36683587 | K = | −0.90000000 |
| A4 = | −0.84829859 × $10^{-4}$ | A4 = | −0.43605077 × $10^{-5}$ |
| A6 = | 0.87043579 × $10^{-4}$ | A6 = | 0.89879868 × $10^{-6}$ |
| A8 = | 0.00000000 | A8 = | −0.16400603 × $10^{-8}$ |
| A10 = | 0.00000000 | A10 = | 0.00000000 |
| Third surface | | Fourth surface | |
| K = | 0.11000000 × 10 | K = | −0.26000000 × 10 |
| A4 = | 0.74515327 × $10^{-3}$ | A4 = | 0.60172489 × $10^{-3}$ |
| A6 = | 0.27297593 × $10^{-4}$ | A6 = | 0.34863764 × $10^{-4}$ |
| A8 = | −0.82165684 × $10^{-5}$ | A8 = | 0.77314146 × $10^{-5}$ |
| A10 = | 0.81605457 × $10^{-8}$ | A10 = | 0.00000000 |
| Fifth surface | | Eighth surface | |
| K = | 0.00000000 | K = | 0.21000000 × 10 |
| A4 = | 0.28716976 × $10^{-3}$ | A4 = | 0.45970146 × $10^{-4}$ |
| A6 = | 0.11374938 × $10^{-4}$ | A6 = | 0.00000000 |
| A8 = | 0.00000000 | A8 = | 0.00000000 |
| A10 = | 0.00000000 | A10 = | 0.00000000 |
| Ninth surface | | | |
| K = | 0.00000000 | | |
| A4 = | −0.26960921 × $10^{-3}$ | | |
| A6 = | 0.00000000 | | |
| A8 = | 0.00000000 | | |
| A10 = | 0.00000000 | | |

EXAMPLE 3

Figure 10:
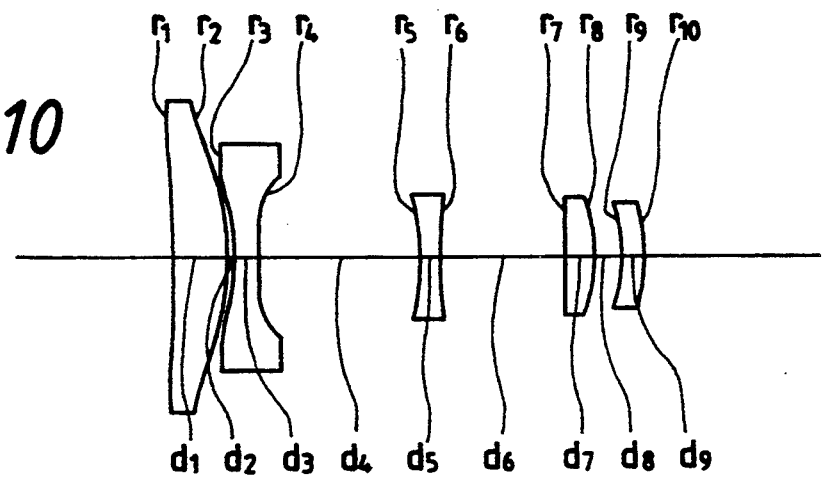
FIG. 10 is a simplified cross-sectional view at the low-magnification end of the zooming viewfinder of Example 3.

FIG. 10 is a simplified cross-sectional view at the low-magnification end of the zooming viewfinder of Example 3. The specific numerical data sheet of the finder are given in Table 7. The values of angular magnification, dioptric strength Dprt, d2 and d4 vary during zooming as shown in Table 8.

All the lens elements are composed of an aspheric surface except at the sixth and seventh faces. The conic constants and aspheric coefficients of those surfaces are listed in Table 9.

Figure 11:
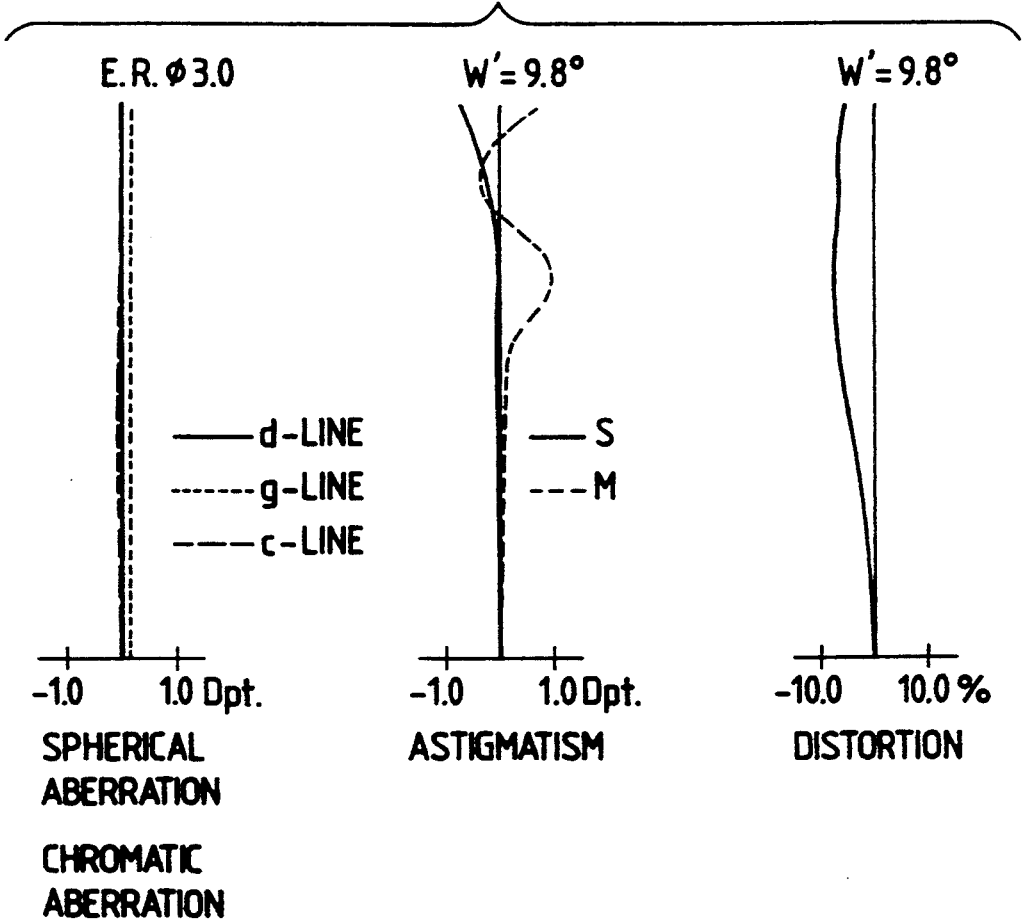
FIG. 11 is a set of graphs plotting the aberration curves obtained with the finder as shown in FIG. 10.
Figure 12:
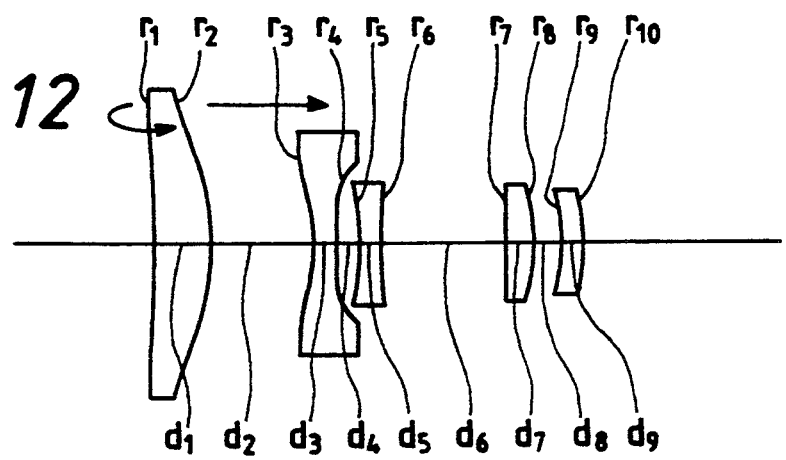
FIG. 12 is a simplified cross-sectional view at the high-magnification end of the zooming viewfinder of Example 3.
Figure 13:
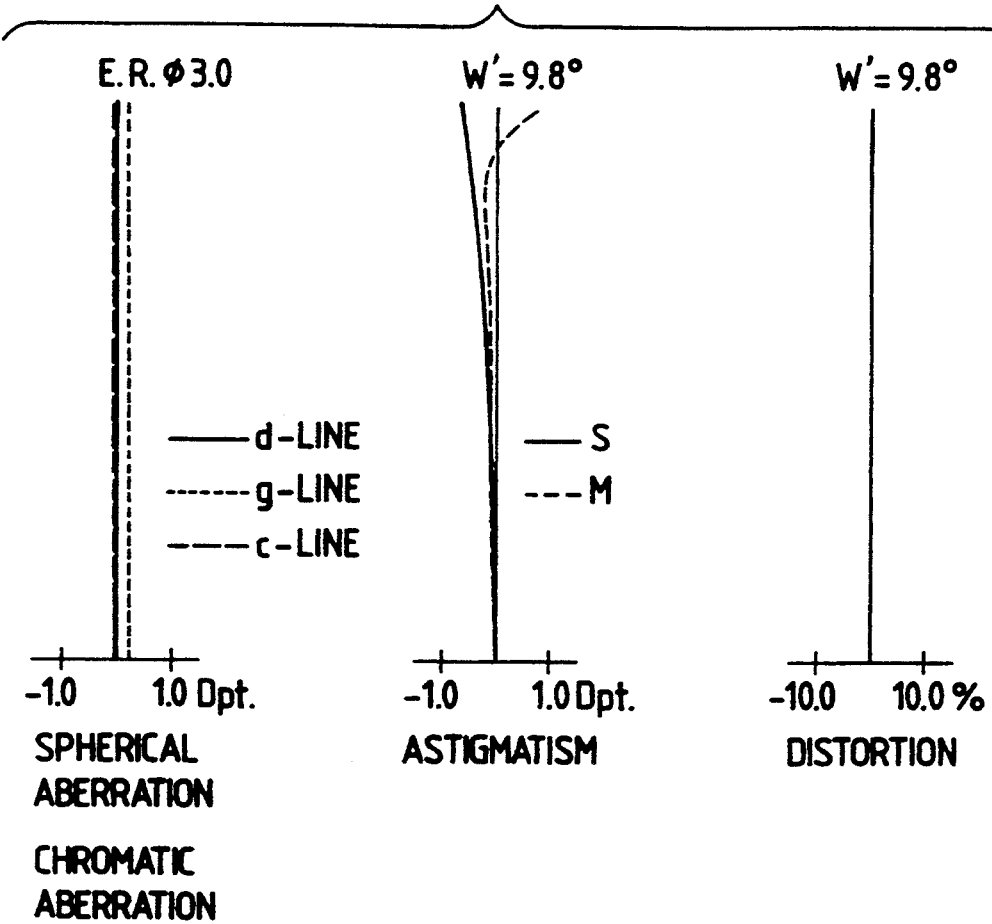
FIG. 13 is a set of graphs plotting the aberration curves obtained with the finder as shown in FIG. 12.

FIG. 11 is a set of graphs plotting the aberration curves obtained with the finder at the low-magnification end; FIG. 12 is a simplified cross-sectional view showing the finder at the high magnification end; and FIG. 13 is a set of graphs plotting the aberration curves obtained at the high-magnification end.

TABLE 7

| Surface No. | r | d | Dd | νd |
|---|---|---|---|---|
| 1 | −72.985 | 3.59 | 1.58547 | 29.9 |
| 2 | −13.670 | variable | | |
| 3 | −9.740 | 1.50 | 1.58547 | 29.9 |
| 4 | 44.776 | variable | | |
| 5 | −12.756 | 1.40 | 1.49176 | 57.4 |
| 6 | 39.459 | 8.01 | | |
| 7 | ∞ | 1.89 | 1.49176 | 57.4 |
| 8 | −9.184 | 1.80 | | |
| 9 | −9.064 | 1.40 | 1.58547 | 29.9 |

TABLE 7-continued

| Surface No. | r | d | Dd | νd |
|---|---|---|---|---|
| 10 | −11.422 | | | |

TABLE 8

| Angular magnification | 0.38× | 0.65× |
|---|---|---|
| Dprt | −1.0 | −1.0 |
| d2 | 0.44 | 6.63 |
| d4 | 10.46 | 1.50 |

TABLE 9

| First surface | | Second surface | |
|---|---|---|---|
| K = | 0.00000000 | K = | 0.00000000 |
| A4 = | 0.43641677 × $10^{-5}$ | A4 = | 0.14606938 × $10^{-3}$ |
| A6 = | 0.40271792 × $10^{-6}$ | A6 = | 0.40191428 × $10^{-6}$ |
| A8 = | 0.00000000 | A8 = | 0.00000000 |
| A10 = | 0.00000000 | A10 = | 0.00000000 |
| Third surface | | Fourth surface | |
| K = | 0.60000000 | K = | 0.00000000 |
| A4 = | 0.26602907 × $10^{-3}$ | A4 = | 0.76993401 × $10^{-4}$ |
| A6 = | 0.55822703 × $10^{-4}$ | A6 = | 0.59012148 × $10^{-4}$ |
| A8 = | −0.14261182 × $10^{-5}$ | A8 = | 0.00000000 |
| A10 = | 0.12687116 × $10^{-7}$ | A10 = | 0.00000000 |
| Fifth surface | | Eighth surface | |
| K = | 0.00000000 | K = | −0.60000000 |
| A4 = | 0.40851955 × $10^{-3}$ | A4 = | 0.32307340 × $10^{-3}$ |
| A6 = | 0.12882032 × $10^{-4}$ | A6 = | 0.00000000 |
| A8 = | 0.00000000 | A8 = | 0.00000000 |
| A10 = | 0.00000000 | A10 = | 0.00000000 |
| Ninth surface | | Tenth surface | |
| K = | 0.00000000 | K = | 0.00000000 |
| A4 = | 0.55251934 × $10^{-3}$ | A4 = | 0.18755176 × $10^{-3}$ |
| A6 = | 0.00000000 | A6 = | 0.00000000 |
| A8 = | 0.00000000 | A8 = | 0.00000000 |
| A10 = | 0.00000000 | A10 = | 0.00000000 |

Table 10 shows how conditions (1) to (7) are satisfied in Examples 1 to 3.

TABLE 10

| Condition | Example 1 | Example 2 | Example 3 |
|---|---|---|---|
| (1) f4/f4b | −0.073 | −0.139 | −0.250 |
| (2) L/f4 | 0.123 | 0.118 | 0.075 |
| (3) rb/f4 | −0.196 | −0.165 | −0.378 |
| (4) ra/f4 | −0.418 | −0.384 | −0.383 |
| (5) rh/f4 | 1.44 | 1.40 | 1.65 |
| (6) N1 | 1.58547 | 1.58547 | 1.58547 |
| (7) N2 | 1.58547 | 1.58547 | 1.58547 |

As described on the foregoing pages, the present invention provides a zooming Albada viewfinder that will not cause vignetting of the reflected light from the field-limiting frame even if the lens diameter of the front group on the object side is reduced. If the specified conditions are met, a viewfinder of higher quality can be provided that is capable of effective correction of aberrations.

What is claimed is:

1. A zooming viewfinder that comprises, in order from the object side, a positive first lens group, a negative second lens group that has a zooming capability and which is capable of moving along an optical axis of the viewfinder, a negative third lens group that has a half mirror surface on the pupil side, and a fourth lens group that is a positive eyepiece and which has a field-limiting frame on the side the closest to the object, said eyepiece comprising, in order from the object side, a positive lens element 4a and a negative lens element 4b which has a concave surface on the object side thereof, said viewfinder satisfying the following condition:

$$0.7 < rb/f4 < -0.1$$

rb: the radius of curvature of the concave surface on the object side of the lens element 4b;

f4: the composite focal length of the fourth lens group taken as a whole.

2. The zooming viewfinder according to claim 1 which satisfies the following conditions:

$$-0.35 < f4/f4b < 0.0$$

$$0.05 < L/f4 < 0.35$$

where f4: the composite focal length of the fourth lens group taken as a whole;

f4b: the focal length of the lens element 4b; and

L: the distance between the lens elements 4a and 4b.

3. The zooming viewfinder according to claim 1 wherein the surface of said third lens group on the pupil side is a concave half mirror surface, said viewfinder satisfying the following conditions:

$$-0.8 < ra/f4 < -0.2$$

$$1 < rh/f4 < 2$$

where rb: the radius for curvature of the concave surface on the object side of the lens element 4b;

f4: the composite focal length of the fourth lens group taken as a whole;

ra: the radius of curvature of the convex surface on the pupil side of the lens element 4a; and rh: the radius of curvature of the concave half mirror surface on the pupil side of the third lens group.

4. The zooming viewfinder according to claim 1 wherein only said second lens group is moved to effect zooming while keeping a diopter value substantially constant.

5. The zooming viewfinder according to claim 1 wherein said first lens group is moved along the optical axis to insure that a diopter value is held constant as said second lens group is moved.

6. A zooming viewfinder as recited in claim 1, which satisfies the following conditions:

$$1.55 < N1$$

$$1.55 < N2$$

wherein

N1: the refractive index of the first lens group; and

N2: the refractive index of the second lens group.

7. The zooming viewfinder according to claim 6 wherein each of said first and second lens groups has an aspheric surface on both sides.

8. The zooming viewfinder according to claim 6 wherein only said second lens group is moved to effect zooming while keeping a diopter value substantially constant.

9. The zooming viewfinder according to claim 6 wherein said first lens group is moved along the optical axis to insure that a diopter value is held constant as said second lens group is moved.

* * * * *